United States Patent [19]
Rhee et al.

[11] Patent Number: 6,026,209
[45] Date of Patent: Feb. 15, 2000

[54] HYBRID OPTICAL WAVEGUIDE AND MANUFACTURING METHOD THEREOF

[75] Inventors: Tae-hyung Rhee, Sungnam; Hyung-jae Lee, Yongin; Byong-gwon You, Daejeon; Eun-ji Kim, Seoul, all of Rep. of Korea

[73] Assignee: SamSung Electronics Co., Ltd., Suwon, Rep. of Korea

[21] Appl. No.: 09/140,449

[22] Filed: Aug. 26, 1998

[30] Foreign Application Priority Data

Aug. 26, 1997 [KR] Rep. of Korea .................. 97-41198

[51] Int. Cl.⁷ ................................................ G02B 6/10
[52] U.S. Cl. ............................................................ 385/129
[58] Field of Search ........................... 385/129–132, 385/147, 50, 141, 142, 1, 2, 3, 4

[56] References Cited

U.S. PATENT DOCUMENTS

| 5,949,944 | 9/1999 | Minford et al. | 385/131 |
| 5,949,945 | 9/1999 | Okano et al. | 385/132 |

FOREIGN PATENT DOCUMENTS

| 3-188402 | 8/1991 | Japan . |
| 6-67042 | 3/1994 | Japan . |
| 8-184720 | 7/1996 | Japan . |
| 11-38253 | 2/1999 | Japan . |
| 2 219 871A | 12/1989 | United Kingdom . |

*Primary Examiner*—Akm E. Ullah
*Attorney, Agent, or Firm*—Robert E. Bushnell, Esq.

[57] ABSTRACT

A hybrid optical waveguide having linear and curved sections through which optical signals pass, includes: a planar substrate layer; a lower cladding layer formed of a material having optical transparency in a predetermined range of optical communication wavelengths, on the planar substrate layer; a core layer formed on the lower cladding layer where the optical waveguide is formed, the waveguide constituted of the linear section formed of a first optical polymer having a higher refractive index than the lower cladding layer and the curved section formed of a second optical polymer having a higher refractive index than the first optical polymer; and an upper cladding layer formed of a material having a lower refractive index than the first and the second optical polymers, surrounding the waveguide core layer. The optical waveguide having the linear and curved sections has reduced traveling losses and optical fiber coupling losses, and minimizes the size of the waveguide cross-section.

8 Claims, 7 Drawing Sheets

FIG. 1 *(Related Art)*
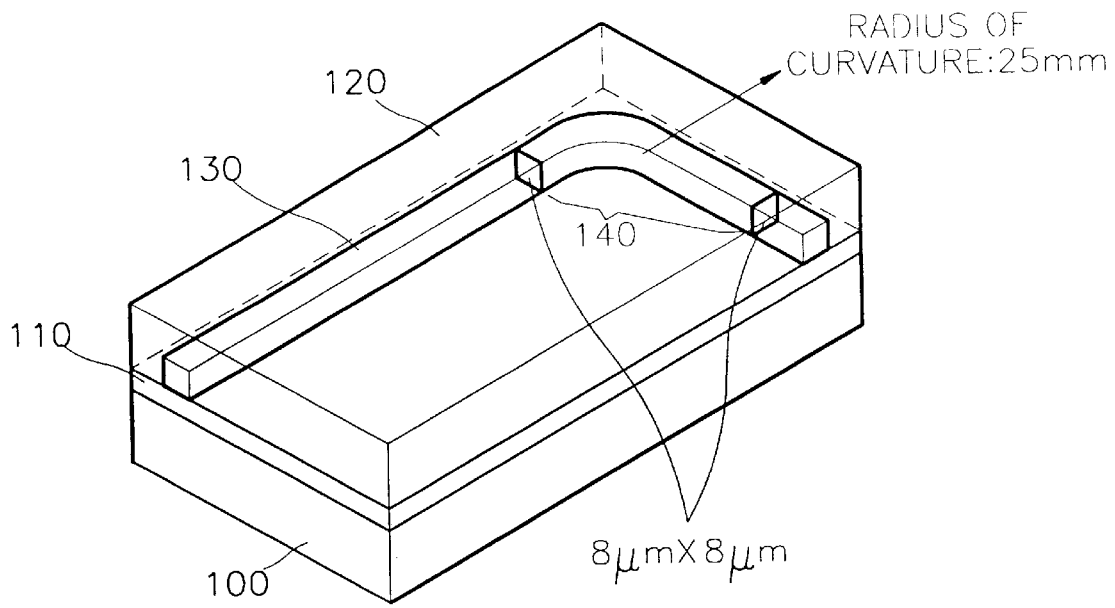
FIG. 2 *(Related Art)*
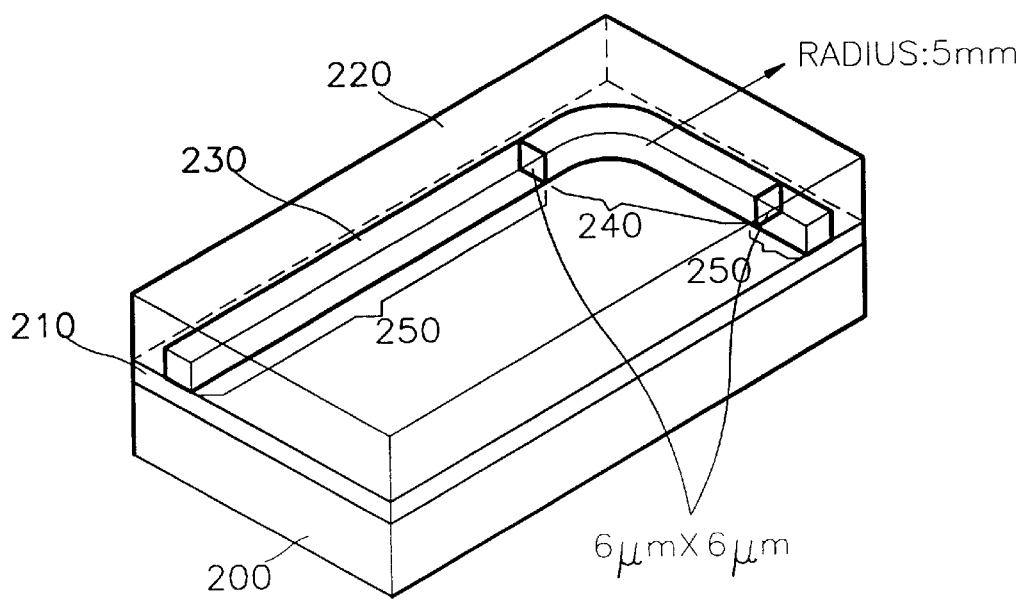

HYBRID OPTICAL WAVEGUIDE AND MANUFACTURING METHOD THEREOF

CLAIM OF PRIORITY

This application makes reference to, incorporates the same herein, and claims all benefits accruing under 35 U.S.C. §119 from an application for HYBRID OPTICAL WAVEGUIDE AND MANUFACTURING METHOD THEREOF earlier filed in the Korean Industrial Property Office on Aug. 26, 1997 and there duly assigned Ser. No. 41198/1997.

BACKGROUND OF THE INVENTION

1. Field of the Invention

The present invention relates to an optical waveguide and a manufacturing method thereof, and more particularly, to a hybrid optical waveguide having reduced optical travel loss and a small waveguide using different waveguide component materials in a linear section thereof and a curved section thereof, and to a manufacturing method thereof.

2. Description of the Related Art

In general, when an optical waveguide is constructed, a difference in refractive indices or specific refraction between a core and a cladding, and the size and curvature of a waveguide crosssection are parameters which affect each other. A curved section in an optical waveguide must be formed of an optical material having a relatively large refractive index, in order to reduce the travel loss of an optical signal passing through the curved section. When an optical waveguide is formed of a material having a relatively large refractive index in consideration of loss in the curved section, the size of a waveguide cross-section suitable for the refractive index is reduced in a linear section without curvature, so that an optical fiber coupling loss is increased upon connection of the waveguide to an optical fiber. On the contrary, if the optical waveguide is fabricated of a material having a relatively small refractive index suitable for the linear section, the travel loss of an optical signal increases in the curved section.

An optical waveguide includes a planar substrate, a lower cladding, an upper cladding, and a waveguide formed of an optical polymer having a specific refractive index. The cross-section of the waveguide must have a specific cross-sectional area in accordance with the specific refractive index to minimize the travel losses of an optical signal. However, the travel losses of the optical signal is significantly higher in a curved section of the waveguide, i.e., in a portion including a curvature, so that the radius of curvature must be large. Another optical waveguide includes a planar substrate, a lower cladding, and a waveguide formed of an optical polymer having a specific refractive index. The cross-section of the waveguide must be of a specific cross-sectional area in accordance with the specific refractive index. Because of the large refractive index, the travel losses of an optical signal in a curved section decrease even when the radius of curvature of the curved section is small whereas the travel losses in a linear section increases. Also, the loss for coupling of a waveguide to an optical cable may be increased because the cross-section of the waveguide must be small.

When such optical waveguides having a curved section is formed of a polymer using an equal specific refractive index, losses of the optical signal must be traded-off with the size of the waveguide. With higher levels of integration of a device including the optical waveguide, and with an increase in the necessity for a waveguide having a curvature, the necessity for solving the above problem increases.

SUMMARY OF THE INVENTION

To solve the above problem, it is an objective of the present invention to provide a hybrid optical waveguide which uses different optical polymers with respect to the linear and curved sections in an optical waveguide, and a fabrication method thereof Accordingly, to achieve the above objective, there is provided a hybrid optical waveguide having a linear section and a curved sections through which optical signals pass, comprising: a planar substrate layer a lower cladding layer, of a material having optical transparency in a predetermined range of optical communication wavelengths, formed on the planar substrate layer; a core layer formed on the lower cladding layer, an optical waveguide constituted of the linear section being formed of a first optical polymer having a higher refractive index than the lower cladding layer and the curved section being formed of a second optical polymer having a higher refractive index than the first optical polymer; and an upper cladding layer, of a material having a lower refractive index than the first optical polymer and formed on the lower cladding layer so as to surround the waveguide core layer.

To achieve the above objective, there is provided a method of manufacturing a hybrid optical waveguide constituted of a linear section and a curved section through which an optical signal of a predetermined wavelength passes, comprising the steps of: forming a lower cladding layer of a material having optical transparency in a predetermined range of optical communication wavelengths on a planar substrate; forming a core layer of a first optical polymer having a higher refractive index than the material forming the lower cladding layer, on the lower cladding layer; forming a core masking pattern on the core layer excluding a portion on which the curved section of the optical waveguide is to be formed; etching a portion of the first optical polymer on which the core masking pattern is not formed; depositing a second optical polymer having a higher refractive index than the first optical polymer, on the resultant structure; etching the deposited residual second optical polymer to leave the second optical polymer in only the core layer on which the first optical polymer has been etched; removing the core masking pattern; forming a waveguide masking pattern on the core layer, the linear section waveguide being positioned on the first optical polymer core layer and the curved section waveguide being positioned on the second optical polymer core layer; etching the first optical polymer without the masking pattern and the second optical polymer; and forming an upper cladding having a lower refractive index than the first optical polymer, on the core layer to surround the hybrid optical waveguide.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 shows an embodiment of an optical waveguide;

FIG. 2 shows another embodiment of an optical waveguide;

DESCRIPTION OF THE PREFERRED EMBODIMENT

Figure 3:
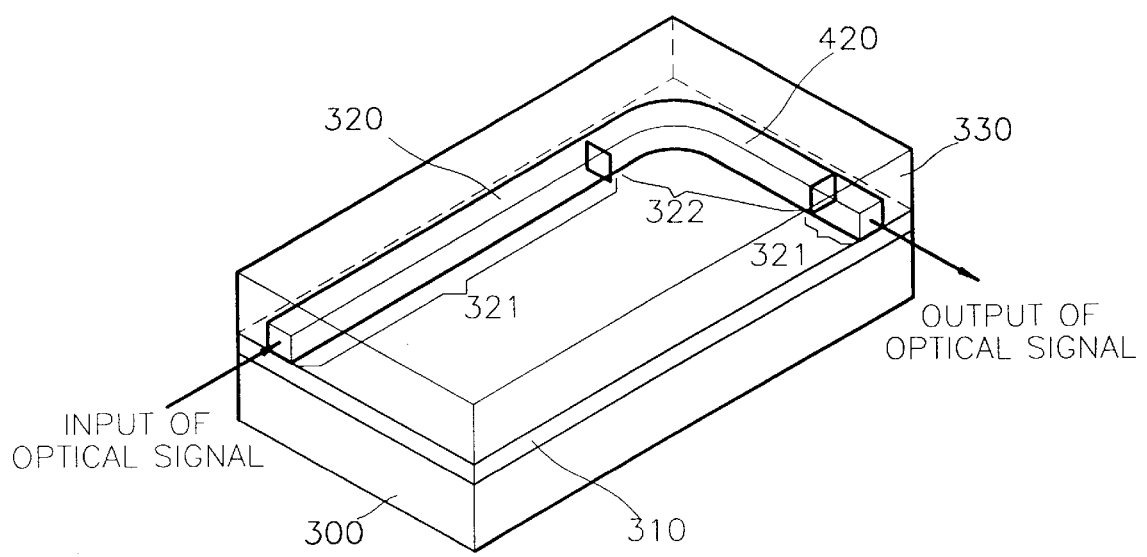
FIG. 3 is a configuration view of a hybrid optical waveguide according to the present invention.
Figure 4A:
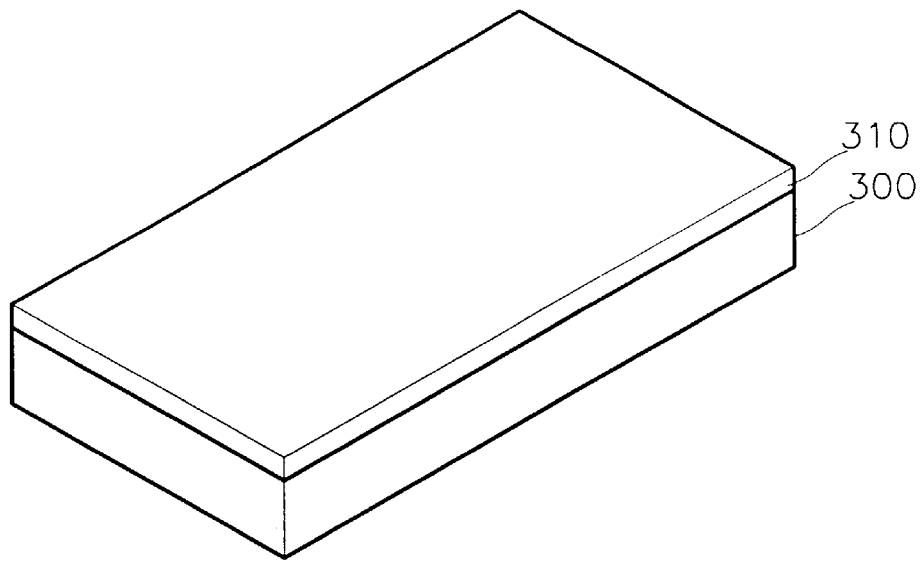
FIGS. 4A through 4J are views for illustrating the manufacturing process of a hybrid optical waveguide according to the present invention.
Figure 4B:
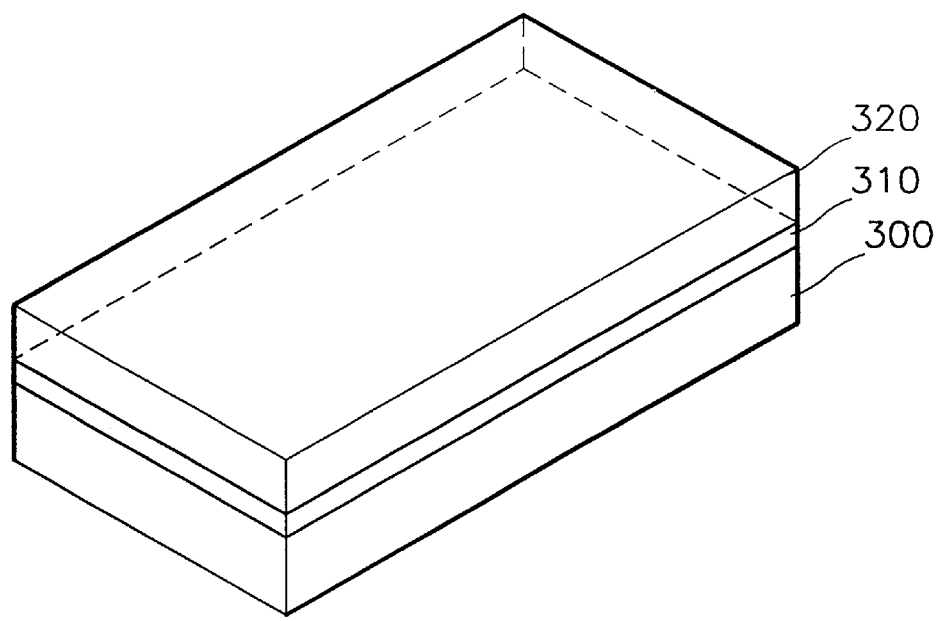
Figure 4C:
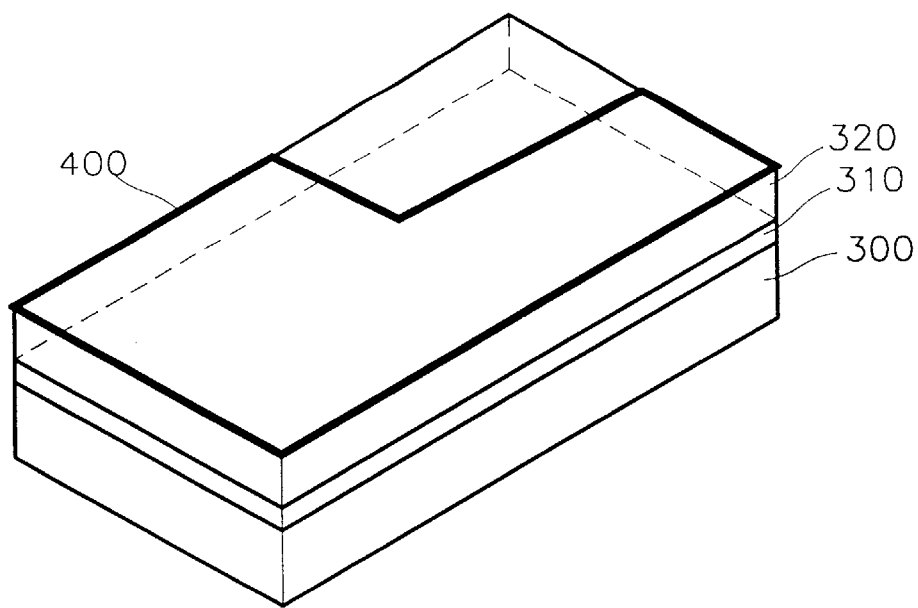
Figure 4D:
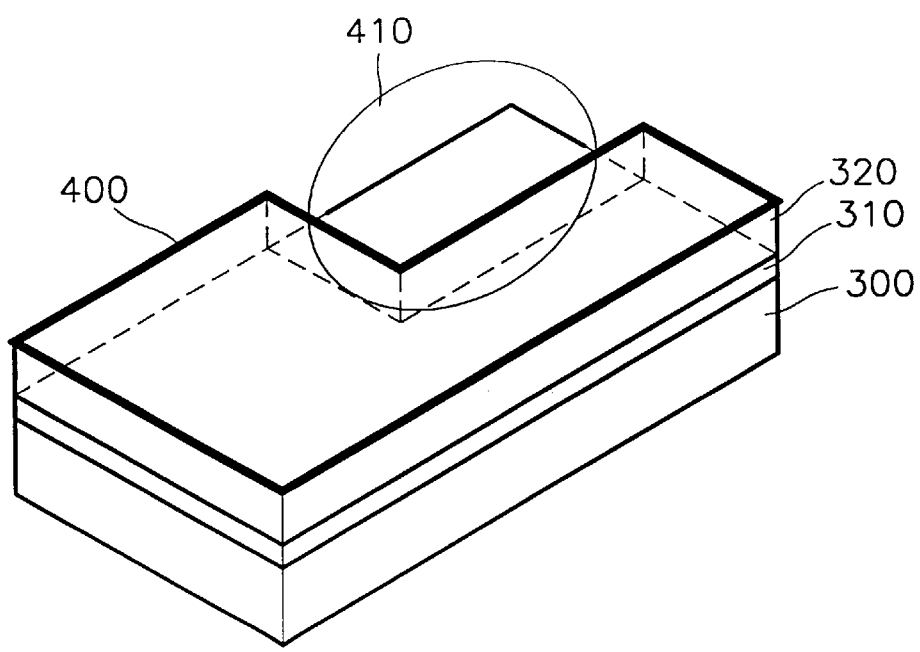
Figure 4E:
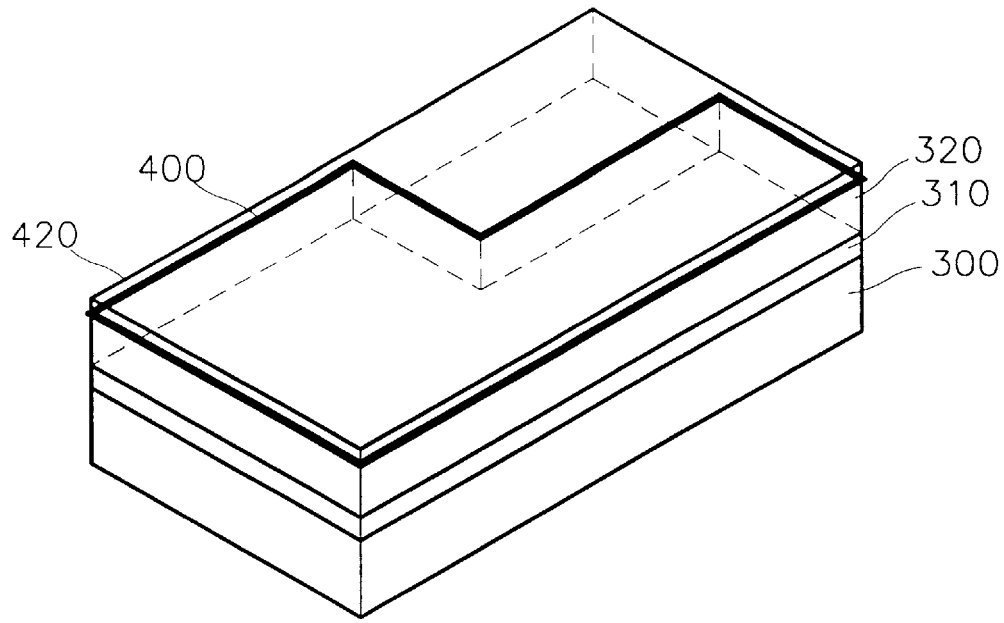
Figure 4F:
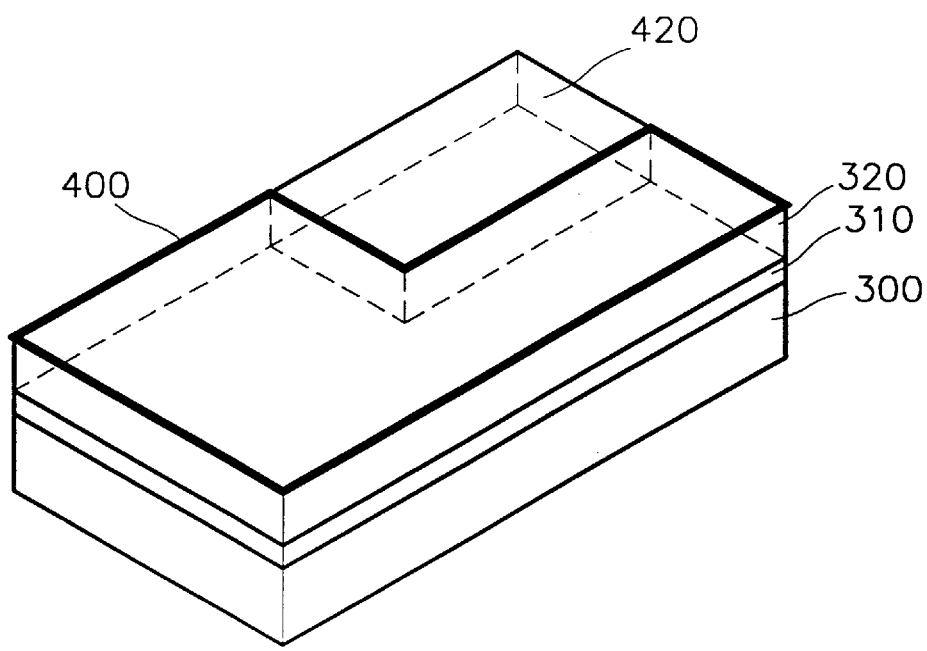
Figure 4G:
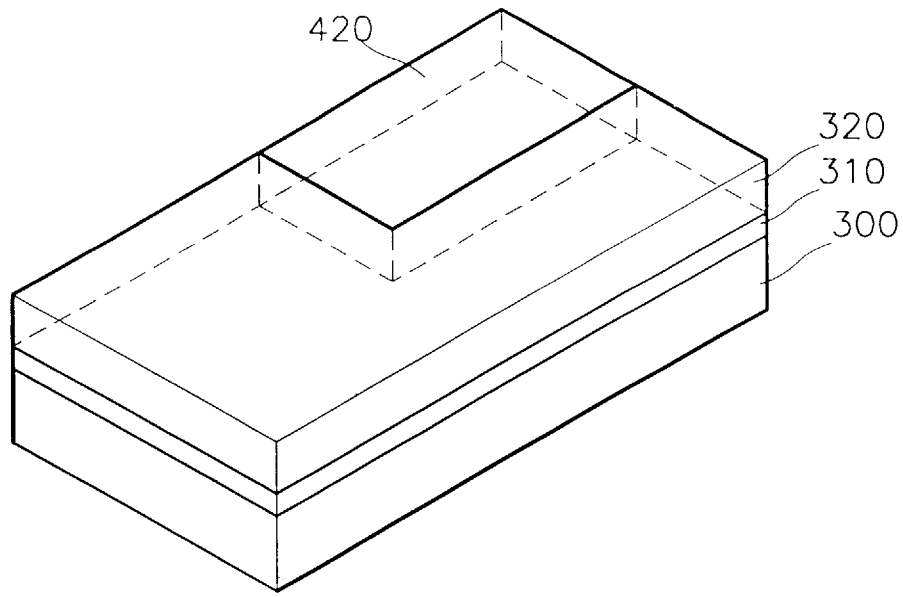
Figure 4H:
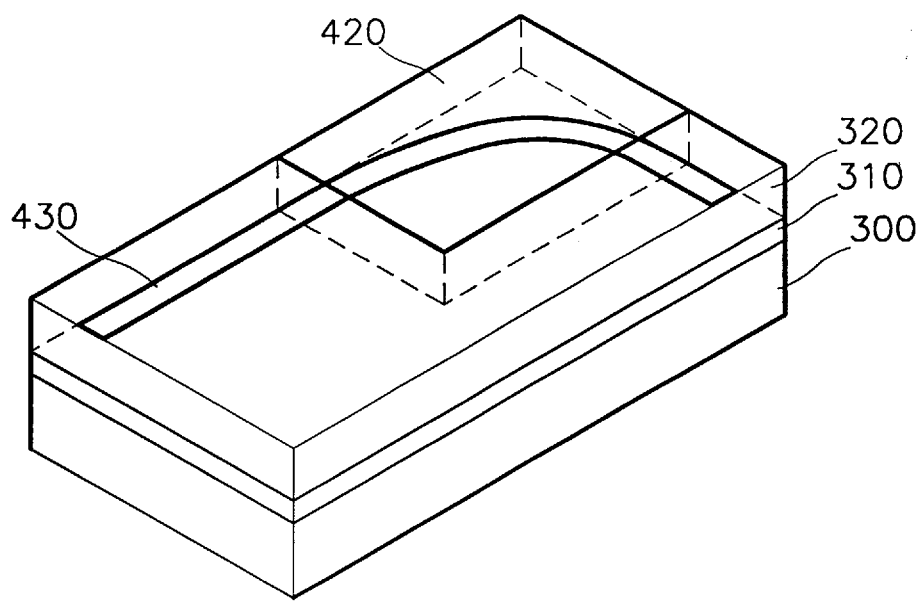
Figure 4I:
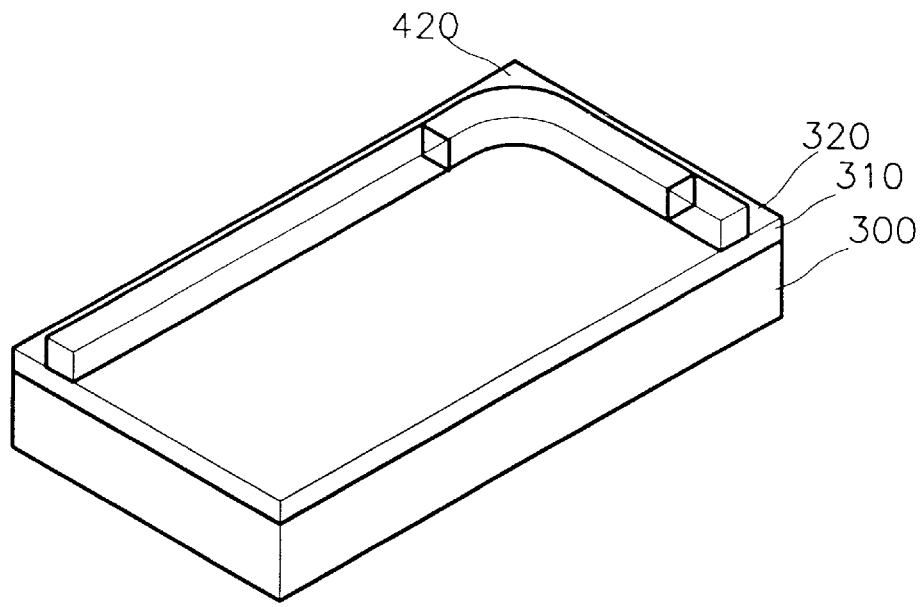
Figure 4J:
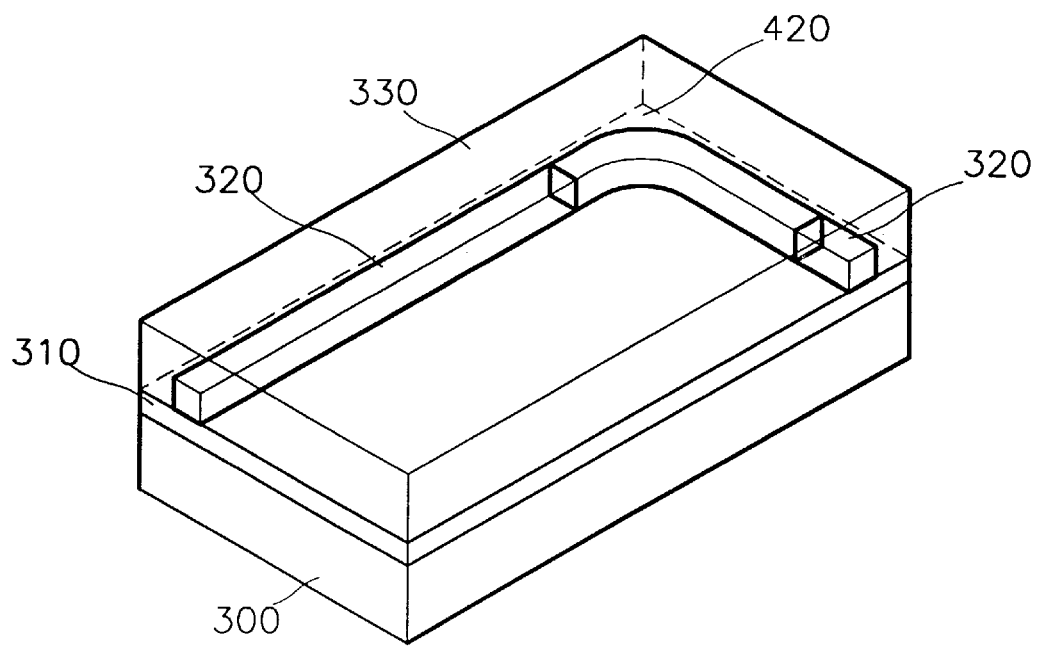

FIG. 1 shows an embodiment of an optical waveguide, which includes a planar substrate 100, a lower cladding 110, an upper cladding 120, and a waveguide 130 formed of an optical polymer having a specific refractive index (Δn) of 0.3%. The cross-section of the waveguide must be 8×8μm in accordance with the specific refractive index (Δn) to minimize the travel losses of an optical signal. However, the travel losses of the optical signal is significantly higher in a curved section 140 of the waveguide, i.e., in a portion including a curvature, so that the radius of curvature must be large, i.e., 25 mm.

FIG. 2 shows another embodiment of an optical waveguide, which includes a planar substrate 200, a lower cladding 210, an upper cladding 220, and a waveguide 230 formed of optical polymer having a specific refractive index (Δn) of 0.75%. The cross-section of the waveguide must be 6×6μm in accordance with the specific refractive index (Δn). Because of the large specific refractive index (Δn), the travel losses of an optical signal in a curved section 240 decrease even when the radius of curvature of the curved section 240 is small, whereas the travel losses in a linear section 250 increases. Also, the loss for coupling of a waveguide to an optical cable may be increased because the cross-section of the waveguide must be small.

Referring to FIG. 3, a hybrid optical waveguide according to the present invention is comprised of a substrate layer 300, a lower cladding layer 310, core layers 320 and 420, and an upper cladding layer 330. The substrate layer 300 is a flat plane wafer made of silicon Si or glass. The lower cladding layer 310, placed on the substrate layer 300, is formed of a material having optical transparency in the optical communication wavelengths, i.e., which transmits light without loss in the light wavelength of the light. The core layers 320 and 420 are obtained by forming an optical waveguide on the lower cladding layer 310. The linear section 320 of the optical waveguide is formed of a first low-loss waveguide optical polymer having a higher refractive index than the material used as the lower cladding layer 310. The curved section 420 of the optical waveguide is formed of a second optical polymer which has a higher refractive index than the first optical polymer and a smaller cross-section of the waveguide than the linear section 320. This is because, when a material forming the curved portion, i.e., a waveguide portion having a curvature, being an optical signal path, has a high refractive index, the travel loss of the optical signal is reduced. Since the cross-section size of the waveguide is determined by the refractive index of a material the waveguide cross-section of the curved section 420 of the second optical polymer having a higher refractive index is smaller than that of the linear section 320 formed of the first optical polymer. The upper cladding layer 330 is formed on the lower cladding layer 310, covering the first and second optical polymer. A material forming the upper cladding layer 330 has a lower refractive index than the first optical polymer, and is generally the same as the material forming the lower cladding layer 310. In FIG. 3, the hybrid optical waveguide is formed of the first optical polymer having a specific refractive index (Δn) of 0.3%, and the second optical polymer having a specific refractive index (Δn) of 0.75%, for example.

FIGS. 4A through 4J are views for illustrating the manufacturing process of a hybrid optical waveguide according to the present invention. First, the lower cladding layer 310 is formed of a material having optical transparency in the optical communication wavelengths, on the planar substrate layer 300, in FIG. 4A. A core layer is formed of the first optical polymer on the lower cladding layer 320, in FIG. 4B. The core layer is formed by spin coating the first optical polymer and baking the first optical polymer to make the surface material of the first optical polymer uniform. A masking pattern 400 is formed on the surface of the core layer 320 excluding a portion where the curved section of the optical waveguide is to be formed, in FIG. 4C. The masking pattern is formed by dry/wet etching or a lift-off method. The formation of the masking pattern using the dry-wet etching method will be described as follows. First, a thin film of polymer, metal or silica, which is more resistant to dry etching than the core layer material, is formed as a masking thin film on the core layer 320. A photosensitive material being photoresist is spin coated on the masking thin film. A photomask which does not cover a portion including the curve section of the optical waveguide is placed on the photoresist, and ultraviolet rays are projected onto the photomask. Then, the resultant structure is developed and baked, thereby forming the masking pattern along the photoresist pattern by dry etching or wet etching. Now, the formation of the masking pattern using the lift-off method will be described as follows. First, a photoresist is spin coated on the core layer 320, a photomask engraved with a pattern is arrayed on the substrate, and ultraviolet rays are selectively projected onto the photoresist. After this process, the resultant structure is developed and baked, and then a masking thin film is deposited on the first polymer layer by a sputtering, E-beam, or thermal evaporation process. Then, the photoresist is lifted off, thereby forming the first masking pattern. After the masking pattern is formed by the lift-off method or dry/wet etching, an unmasked portion 410 is etched, in FIG. 4D. As an example of etching, when oxygen plasma is applied to the upper surface of a portion to be etched under a vacuum state, the portion with the masking pattern is not etched, while only the portion without the masking pattern is etched. During etching, the etch depth is controlled in consideration of the cross-section of the curved section depending on the refractive index of the second optical polymer to form the curved section later. The second optical polymer having a higher refractive index than the first optical polymer is deposited on the core layer 320 by spin coating, thereby filling the etched portion, in FIG. 4E. The second optical polymer is filled in the etched portion 410 of FIG. 4D, and covers the first optical polymer. The second optical polymer on the surface of the masking pattern positioned on the core layer is etched, in FIG. 4F. Consequently, the portion with the masking pattern 400 on the core layer is formed of the first optical polymer, and the portion 420 without masking patterns is formed of the second optical polymer. The masking pattern 400 protects the first optical polymer layer during the second optical polymer etching process performed in FIG. 4F. After removing the masking pattern 400 in FIG. 4G, a waveguide masking pattern 430 with the width of the optical waveguide is formed on the upper surface of the core layer, in FIG. 4H. The masking pattern 430 can be formed by the above-described dry/wet etching process or a lift-off method. The linear waveguide section in the waveguide masking pattern 430 is positioned on the first optical polymer, and the curved waveguide section is positioned on the second optical polymer. A first and second optical polymer core layer on which the waveguide masking pattern 430 is not formed is entirely etched, and the waveguide masking pattern 430 is then removed, thereby completing the formation of the hybrid waveguide, in FIG. 4I. The above-described hybrid optical waveguide fabrication process does not require an accurate combination process for coupling the first optical polymer linear section and the second optical polymer curve section to each other. The upper cladding layer 330 is formed of the material of the lower cladding layer 310, surrounding the core layer 320 forming the completed hybrid optical waveguide, in FIG. 4J.

In order to reduce the travel loss of an optical signal in an optical waveguide having linear and curved sections and minimize the waveguide size of the linear section in accordance with the refractive index of the linear section, the hybrid optical waveguide is formed of materials having different refractive indices with respect to the curved and linear sections. As shown in FIG. 1, a radius of curvature of 25 mm or more in the curved section is required in the waveguide formed of polymer having a refractive index $\Delta n$ of 0.3%. This increases the size of a waveguide device including the waveguide. As shown in FIG. 3, in the waveguide formed of polymer having a refractive index $\Delta n$ of 0.75%, travel loss and combination loss of light in the linear section may increase instead of the radius of curvature becoming smaller. Also, as described above, the simply manufactured hybrid optical waveguide uses different materials to form the linear and curved sections, in order to prevent the conflicting relationship between the specific refractive index and the waveguide cross-section size, in contrast to the above noted waveguide having equal refractive indices $\Delta n$.

Accordingly, an optical waveguide having linear and curved sections can reduce travel loss and combination loss of an optical signal, and minimize the size of the waveguide cross-section.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A hybrid optical waveguide having a linear section and a curved section through which an optical signal of a predetermined wavelength pass, comprising:
    a planar substrate layer;
    a lower cladding layer formed on the planar substrate layer of a material having optical transparency in a predetermined range of optical communication wavelengths;
    a core layer formed on the lower cladding layer where the optical waveguide is formed, the waveguide constituted of the linear section formed of a first optical polymer having a higher refractive index than the lower cladding layer and the curved section formed of a second optical polymer having a higher refractive index than the first optical polymer; and
    an upper cladding layer formed on the lower cladding layer so as to surround the waveguide core layer, the upper cladding layer formed of a material having a lower refractive index than the first optical polymer.

2. The hybrid optical waveguide as claimed in claim 1, the planar substrate layer comprising a wafer of one of either silicon or glass having a high degree of flatness.

3. A method of manufacturing a hybrid optical waveguide constituted of a linear section and a curved section through which an optical signal of a predetermined wavelength passes, comprising the steps of:
    forming a lower cladding layer of a material having optical transparency in a predetermined range of optical communication wavelengths, on the planar substrate;
    forming a core layer of a first optical polymer on the lower cladding layer, the core layer having a higher refractive index than the material forming the lower cladding layer;
    forming a core masking pattern on the core layer excluding a portion on which the curved section of the optical waveguide is to be formed;
    etching a portion of the first optical polymer on which the core masking pattern is not formed;
    depositing a second optical polymer having a higher refractive index than the first optical polymer;
    etching the deposited residual second optical polymer to leave the second optical polymer in only the core layer on which the first optical polymer has been etched;
    removing the core masking pattern;
    forming a waveguide masking pattern on the core layer, the linear section waveguide positioned on the first optical polymer core layer and the curved section waveguide being positioned on the second optical polymer core layer;
    etching the first optical polymer without the masking pattern and the second optical polymer; and
    forming an upper cladding on the core layer so as to surround the hybrid optical waveguide, the upper cladding layer having a lower refractive index than the first optical polymer.

4. The method of manufacturing a hybrid optical waveguide as claimed in claim 3, the step of forming the first optical polymer as the core layer comprising the substeps of:
    spin coating the first optical polymer on the lower cladding layer;
    baking; and
    smoothing the surface of the first baked optical polymer.

5. The method of manufacturing a hybrid optical waveguide as claimed in claim 3, the core masking pattern and the waveguide masking pattern being formed by either a dry/wet etching or a lifting off method.

6. The method of manufacturing a hybrid optical waveguide as claimed in claim 3, the second optical polymer being deposited by spin coating.

7. The method of manufacturing a hybrid optical waveguide as claimed in claim 3, the waveguide masking pattern having different widths depending on the refractive indices of the first and second optical polymers.

8. The method of manufacturing a hybrid optical waveguide as claimed in claim 2, the etching according to the waveguide pattern being effected by controlling the etch depth in accordance with the cross-section size of the second optical polymer depending on the refractive index of the second optical polymer.

* * * * *